United States Patent
Shimizu et al.

(10) Patent No.: US 9,676,936 B2
(45) Date of Patent: Jun. 13, 2017

(54) PREPREG, FIBER-REINFORCED COMPOSITE MATERIAL, AND THERMOPLASTIC RESIN PARTICLES

(71) Applicant: TORAY INDUSTRIES, INC., Tokyo (JP)

(72) Inventors: Yuko Shimizu, Otsu (JP); Hiroshi Kobayashi, Nagoya (JP); Nobuyuki Tomioka, Nagoya (JP); Hiroshi Takezaki, Nagoya (JP); Shirou Honda, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 51 days.

(21) Appl. No.: 14/759,570

(22) PCT Filed: Jan. 24, 2014

(86) PCT No.: PCT/JP2014/051520
§ 371 (c)(1),
(2) Date: Jul. 7, 2015

(87) PCT Pub. No.: WO2014/115844
PCT Pub. Date: Jul. 31, 2014

(65) Prior Publication Data
US 2015/0344686 A1    Dec. 3, 2015

(30) Foreign Application Priority Data
Jan. 28, 2013 (JP) ................. 2013-012965

(51) Int. Cl.
*B32B 27/04* (2006.01)
*B32B 27/20* (2006.01)
*B32B 27/38* (2006.01)
*C08L 63/00* (2006.01)
*C08L 77/00* (2006.01)
*C08L 29/04* (2006.01)
*C08J 5/24* (2006.01)

(52) U.S. Cl.
CPC ............... *C08L 63/00* (2013.01); *C08J 5/24* (2013.01); *C08L 29/04* (2013.01); *C08L 77/00* (2013.01); *C08J 2363/00* (2013.01)

(58) Field of Classification Search
None
See application file for complete search history.

(56) References Cited

U.S. PATENT DOCUMENTS

| 5,449,722 A * | 9/1995 | Nishida ................. C08L 23/02 524/447 |
| 2008/0081170 A1 | 4/2008 | Tilbrook et al. |
| 2010/0063191 A1* | 3/2010 | Hirono ................. C08J 3/12 524/284 |
| 2015/0031834 A1 | 1/2015 | Kobayashi et al. |

FOREIGN PATENT DOCUMENTS

| EP | 2147035 B1 | 6/2011 |
| EP | 2738202 A1 | 6/2014 |
| EP | 2816072 A1 | 12/2014 |
| JP | 2009-221460 A | 10/2009 |
| JP | 2010-525102 A | 7/2010 |
| JP | 2011-144358 A | 7/2011 |
| JP | 2012-229396 A | 11/2012 |
| WO | WO 2013/122008 A1 | 8/2013 |

OTHER PUBLICATIONS

International Search Report, issued in PCT/JP214/051520, dated May 13, 2014.
Extended European Search Report for European Application No. 14743437.7, dated Aug. 8, 2016.

* cited by examiner

*Primary Examiner* — Michael J Feely
(74) *Attorney, Agent, or Firm* — Birch, Stewart, Kolasch & Birch, LLP

(57) ABSTRACT

The invention provides a prepreg that can give a fiber-reinforced composite material exhibiting stable and excellent interlaminar fracture toughness and impact resistance under wide molding conditions. The prepreg includes at least a reinforcement fiber [A], a thermosetting resin [B], and the following component [C] wherein 90% or more of the material [C] is present inside a region of the prepreg that extends from any surface of the prepreg to a prepreg site having, from the surface, a depth of 20% of the thickness of the prepreg. The component [C] satisfies requirements that (i) the storage elastic modulus G' of the material constituting the particles is more than 1 MPa, and 70 MPa or less at 180° C., and that (ii) the ratio of the storage elastic modulus G' of the material constituting the particles at 160° C. to the storage elastic modulus G' of the material at 200° C. ranges from 1 to 5; and is insoluble in the thermosetting resin [B].

10 Claims, No Drawings

PREPREG, FIBER-REINFORCED COMPOSITE MATERIAL, AND THERMOPLASTIC RESIN PARTICLES

TECHNICAL FIELD

The present invention relates to a prepreg that can give a fiber-reinforced composite material exhibiting stable and excellent interlaminar fracture toughness and impact resistance under wide molding conditions, a fiber-reinforced composite material using this prepreg, and thermoplastic resin particles suitable for a reinforced material for the prepreg and the fiber-reinforced composite material.

BACKGROUND ART

Fiber-reinforced composite materials, in particular, carbon-reinforced composite materials are excellent in specific strength and specific rigidity to be useful, and the use thereof has been developing widely for airplane structural members, blades of a windmill, outside plates of an automobile, and members for computers, such as IC trays or laptop enclosures (housings). Demands therefor have been increasing year by year.

A fiber-reinforced composite material is a heterogeneous material obtained by molding a prepreg containing, as essential materials, a reinforcement fiber and a matrix resin. Thus, a large difference exists in physical properties between the array direction of the reinforcement fiber and any other direction. For example, it is known that the composite material is not drastically improved in interlaminar fracture toughness, which shows the difficulty degree of the advance of a destruction of reinforcement-fiber-layers of the material between these layers, only by improving the strength of the reinforcement fiber. In particular, a carbon fiber reinforced composite material containing a thermosetting resin as a matrix resin has a property of being easily destroyed by a strain along any direction other than the array direction of the reinforcement fiber, this matter being reflected on a low rigidity of the matrix resin. Thus, various techniques have been suggested to improve physical properties of a composite material that are capable of coping with a strain along any direction other than the array direction of the reinforcement fiber, a typical example of the physical-properties being interlaminar fracture toughness, while the composite material keeps a compression strength in a high-temperature and high-humidity environment, this strength being required, in particular, for airplane structural members. For example, many techniques are disclosed for improving a composite material in compression strength after impact, which is particularly required for airplane structural members.

Furthermore, in recent years, airplane structural moieties to each of which a fiber-reinforced composite material is applied have been increasing. Additionally, the application of a fiber-reinforced composite material has been advancing to windmill blades and various turbines that aim to be improved in electric power efficiency or energy conversion efficiency. About the application of the material to a member large in wall thickness and a large-sized member in each of which many prepregs are laminated onto each other number of laminated sheets of many thick member of the prepreg, apply study to the large member, investigations have been advanced. When such a large-sized structural member is molded, a difference in thermal hysteresis cannot be avoided between its moieties. About such a fiber-reinforced composite material, therefore, even when a fluctuation is generated to some degree in temperature-time profile at the time of molding the material, the material has been required to exhibit morphology and properties equivalent to each other.

Against such problems, suggested is a technique of arranging, in regions between fiber layers (i.e., in interlaminar regions), a particulate material in which, for example, a high-toughness polyamide is used, so as to heighten the resultant workpiece in Mode II interlaminar fracture toughness, and restrain the outer surface of the member from being damaged by falling-weight impact (see Patent Document 1). In this technique, a high-toughness component is located in the form of particles onto the outer surface of a prepreg; thus, the interlaminar fracture toughness can be made high without damaging handleabilities of the prepreg, such as the tackiness or the drape thereof. However, even when this technique is used, the interlaminar particles are deformed in accordance with conditions for molding the fiber-reinforced composite material, so that the interlaminar form is fluctuated. As a result, there remains a problem that the resultant cannot exhibit a stable interlaminar fracture toughness nor impact resistance.

A material is disclosed which exhibits not only a high impact resistance but also a high interlaminar fracture toughness by using a matrix resin containing high-melting-point thermoplastic particles and low-melting-point thermoplastic particles (see Patent Document 2). Even by use of this technique, however, in accordance with conditions for molding the fiber-reinforced composite material, the molded material undergoes the melting or deformation of its interlamilar particles so that the resultant product is varied in interlamilar form. Thus, the product cannot exhibit a stable interlaminar fracture toughness nor impact resistance. Furthermore, a material is disclosed which is improvable in impact resistance and interlaminar fracture toughness while keepable in heat resistance by combining two particle species different from each other in glass transition temperature (Tg) with each other; and an example is disclosed in which complete-sphere-form polyamide particle species different from each other in Tg and particle diameter are combined with each other (see Patent Document 3). Even by use of this technique, however, in accordance with conditions for molding the fiber-reinforced composite material, the molded material undergoes the melting or deformation of its interlamilar particles so that the resultant product is varied in interlamilar form. Thus, the product cannot exhibit a stable interlaminar fracture toughness nor impact resistance.

PRIOR ART DOCUMENTS

Patent Documents

Patent Document 1: U.S. Pat. No. 5,028,478
Patent Document 2: Japanese Unexamined Patent Application Publication No. 2010-525101
Patent Document 3: Japanese Unexamined Patent Application Publication No. Hei 07-41576

SUMMARY OF THE INVENTION

Problems to be Solved by the Invention

The present invention provides a prepreg that can give a fiber-reinforced composite material exhibiting stable and excellent interlaminar fracture toughness and impact resistance under wide molding conditions, a fiber-reinforced composite material using this prepreg, and thermoplastic resin particles suitable for a reinforcement material for the prepreg and the fiber-reinforced composite material.

Solutions to the Problems

In order to attain this object, the present invention is as follows:

A first aspect of the present invention is a prepreg, comprising at least the following materials [A] to [C], wherein 90% or more of the material [C] is present inside a region of the prepreg that extends from any surface of the prepreg to a prepreg site having, from the surface, a depth of 20% of the thickness of the prepreg:

a reinforcement fiber [A], a thermosetting resin [B], and thermoplastic resin particles [C] which are insoluble in the thermosetting resin [B], and which satisfy the following (i) and (ii):

(i) the storage elastic modulus G' of the material constituting the particles is more than 1 MPa, and 70 MPa or less at 180° C., and (ii) the ratio of the storage elastic modulus G' of the material constituting the particles at 160° C. to the storage elastic modulus G' of the material at 200° C. ranges from 1 to 5.

According to a preferred embodiment of the present invention, the thermoplastic resin particles [C] comprise a composition comprising at least one polymer having crystallinity, and at least one non-crystalline polymer.

According to a preferred embodiment of the present invention, the ratio in the blend composition ranges from 19/1 to 1/19.

According to a preferred embodiment of the present invention, the thermoplastic resin particles [C] have a glass transition temperature of 80 to 180° C.

According to a preferred embodiment of the present invention, the thermoplastic resin particles [C] have a sphericity of 90 to 100.

According to a preferred embodiment of the present invention, the reinforcement fiber [A] is carbon fiber.

According to a preferred embodiment of the present invention, the thermosetting resin [B] is an epoxy resin.

In the present invention, a fiber-reinforced composite material can be produced by curing the prepreg.

A second aspect of the present invention is thermoplastic resin particles satisfying the following (i) and (ii):

(i) the storage elastic modulus G' of the material constituting the particles is more than 1 MPa, and 70 MPa or less at 180° C., and (ii) the ratio of the storage elastic modulus G' of the material constituting the particles at 160° C. to the storage elastic modulus G' of the material at 200° C. ranges from 1 to 5.

According to a preferred embodiment of the present invention, the thermoplastic resin particles comprise a composition comprising at least one polymer having crystallinity, and at least one non-crystalline polymer.

Effects of the Invention

The present invention makes it possible to yield a prepreg that can give a fiber-reinforced composite material exhibiting stable and excellent interlaminar fracture toughness and impact resistance under wide molding conditions, a fiber-reinforced composite material using this prepreg, and thermoplastic resin particles suitable for a reinforcement material for the prepreg and the fiber-reinforced composite material.

EMBODIMENTS OF THE INVENTION

Hereinafter, a detailed description will be made about the prepreg, the fiber-reinforced composite material, and the thermoplastic resin particles of the present invention.

The prepreg of the present invention contains a thermosetting resin [B]. Specific examples of the thermosetting resin include epoxy resin, benzooxazine resin, vinyl ester resin, unsaturated polyester resin, urethane resin, phenolic resin, melamine resin, maleimide resin, cyanurate resin, and urea resin and the like. Of these resins, preferred are epoxy resin, benzooxazine resin, vinyl ester resin, unsaturated polyester resin and phenolic resin, and any mixture of two or more of these resins since the resins and the mixture are high in mechanical properties. In particular, epoxy resin is especially preferred since the resin is excellent in mechanical properties, and bondability to reinforcement fiber.

As the epoxy resin, a compound is used which has, in a single molecule thereof, two or more epoxy groups.

The epoxy resin in the present invention may be specifically, for example, an epoxy resin having an aromatic glycidyl ether obtained from a phenolic compound having hydroxyl groups, an aliphatic glycidyl ether obtained from an alcohol having hydroxyl groups, a glycidylamine obtained from an amine, a glycidyl ester obtained from a carboxylic acid having carboxyl groups, or an oxirane ring and the like.

Of these examples, a glycidylamine type epoxy resin is preferably usable since the resin is low in viscosity to be excellent in impregnation performance into reinforcement fiber, and further excellent in heat resistance, and elastic modulus and other mechanical properties when the resin is made into a fiber-reinforced composite material. The glycidylamine type epoxy resin can be roughly classified into any polyfunctional amine type epoxy resin and any bifunctional amine type epoxy resin.

The polyfunctional amine type epoxy resin may be a glycidylamine type epoxy resin containing, in a single molecule thereof, three or more epoxy groups. The polyfunctional amine type epoxy resin may be, for example, tetraglycidyldiaminodiphenylmethane, triglycidylaminophenol or tetraglycidylxylylenediamine; any halogen-substituted compound, alkyl-group-substituted compound, aralkyl-group-substituted compound, alkenyl-group-substituted compound, alkoxy-group-substituted compound, aralkoxy-group-substituted compound or allyloxy-group-substituted compound; or a hydrogenated product of any one of the compounds given hereinbefore. The bifunctional amine type epoxy resin is also usable. The compound may be, for example, diglycidylaniline; any halogen-substituted compound, alkyl-group-substituted compound, aralkyl-group-substituted compound, allyl-group-substituted compound, alkoxy-group-substituted compound, aralkoxy-group-substituted compound or allyloxy-group-substituted compound of diglycidylaniline; or a hydrogenated product of any one of the compounds given hereinbefore.

The polyfunctional amine type epoxy resin is not particularly limited. Preferred examples thereof include tetraglycidyldiaminodiphenylmethane, triglycidylaminophenol and tetraglycidylxylylenediamine; and substituted compounds and hydrogenated compounds thereof.

As the compound tetraglycidyldiaminodiphenylmethane, for example, the following products are usable: "SUMIEP- OXY (registered trade name) " ELM434, (manufactured by Sumitomo Chemical Co., Ltd.), YH434L (manufactured by Nippon Steel & Sumitomo Metal Corp.), "jER (registered trade name) " 604 (manufactured by Mitsubishi Chemical Corp.), "Araldite (registered trade name)" MY720 and MY721 (manufactured by Huntsman Advanced Material LLC) and the like. As the compound triglycidylaminophenol or an alkyl-substituted compound thereof, the following products are usable: "SUMIEPOXY (registered trade name) " ELM100 and ELM120 (manufactured by Sumitomo Chemical Co., Ltd.), "Araldite (registered trade name) " MY0500, MY0510 and MY0600 (manufactured by Huntsman Advanced Material LLC), and "jER (registered trade name) " 630 (manufactured by Mitsubishi Chemical Corp.). As the compound tetraglycidylxylylenediamine or a hydrogenated compound thereof, the following products are usable: "TETRAD (registered trade name) " -X, and "TETRAD (registered trade name) "-C (manufactured by Mitsubishi Gas Chemical Co., Inc.).

The polyfunctional amine type epoxy resin is preferably usable as the epoxy resin in the present invention since a resin cured product obtained therefrom is excellent in balance between heat resistance and mechanical properties such as elastic modulus. The polyfunctional amine type epoxy resin is contained desirably in a proportion of 40 to 70% by mass of all epoxy resin.

The epoxy resin in the present invention may contain, for example, any epoxy resin other than glycidyl amine, or a copolymer of an epoxy resin and a thermosetting resin. Examples of the thermosetting resin used to be copolymerized with the epoxy resin include unsaturated polyester resin, vinyl ester resin, epoxy resin, benzooxadine resin, phenolic resin, urea resin, melamine resin, and polyimide resin. These resin compositions and compounds may be used alone or in the form of an appropriate blend.

As a bifunctional epoxy resin, out of epoxy resins usable as the epoxy resin other than glycidyl amine, it is preferred to use a glycidyl ether type epoxy resin, a precursor of which is phenol. Examples of this epoxy resin include bisphenol A type epoxy resin, bisphenol F type epoxy resin, bisphenol S type epoxy resin, naphthalene type epoxy resin, biphenyl type epoxy resin, urethane-modified epoxy resin, and hydantoin type and resorcinol type epoxy resins and the like.

In the present invention, the thermosetting resin [B] may contain a curing agent. The curing agent denotes the following compound when an epoxy resin is used as the thermosetting resin: a compound having an active group reactive with epoxy groups of the resin. Specific examples of the curing agent for the epoxy resin include dicyan diamide, aromatic polyamines, aminobenzoates, various acid anhydrides, phenol novolak resin, cresol novolak resin, polyphenol compounds, imidazole derivatives, aliphatic amines, tetramethylguanidine, thiourea-added amines, carboxylic anhydrides such as methylhexahydrophthalic anhydride, carboxylic acid hydrazides, carboxylic acid amides, polymercaptans, and Lewis acid complexes such as an ethylamine boron trifluoride complex.

The use of any one of the aromatic polyamines makes it possible to yield an epoxy resin cured product good in heat resistance. Of the aromatic polyamines, the most suitable curing agents are diaminodiphenylsulfone, derivatives thereof, and various isomers thereof to yield an epoxy resin cured product good in heat resistance.

By using a combination of dicyandiamide with a urea compound such as 3,4-dichlorophenyl-1,1-dimethylurea, or using an imidazole compound as the curing agent, the epoxy resin gives a high heat and water resistance while cured at a relatively low temperature. The use of an acid anhydride to cure the epoxy resin gives a cured product lower in water absorption than the use of an amine compound to cure the resin. Additionally, in the case of using a curing-power-latently-exhibiting product of any one of the above-mentioned curing agents, for example, a product in which the agent is micro-encapsulated, the resultant prepreg is not easily changed in storage stabilities, in particular, tackiness and drape even when allowed to stand still at room temperature.

An optimal addition amount of the curing agent is varied in accordance with the respective kinds of the epoxy resin and the curing agent. About, for example, an aromatic amine curing agent, it is preferred to add the agent to set the amounts into chemically stoichiometric equivalents to each other. However, by setting the ratio of the amount of active hydrogen atoms of the aromatic amine curing agent to the epoxy group amount of the epoxy resin into the range of about 0.7 to 0.9, a resin higher in elastic modulus may be obtained than by using the resin and the agent in amounts equivalent to each other. This case is also a preferred embodiment. The above-mentioned curing agents may be used alone or in any combination of two or more thereof.

Examples of a commercially available product of the aromatic polyamine curing agent include products Seikacure-S (manufactured by Wakayama Seika Kogyo Co., Ltd.), MDA-220 (manufactured by Mitsui Chemicals, Inc.), "jER CURE (registered trade name)" W (manufactured by Mitsubishi Chemical Corp.), 3,3'-DAS (manufactured by Mitsui Chemicals, Inc.), and "Lonzacure (registered trade name) " M-DEA, "Lonzacure (registered trade name) " M-DIPA, "Lonzacure (registered trade name) " M-MIPA and "Lonzacure (registered trade name) " DELDA 80 (each manufactured by a company, Lonza).

The epoxy resin and any one of these curing agents, or a product obtained by causing the two partially to react preliminarily with each other may be incorporated into the composition. This manner is, in some cases, effective for adjusting the viscosity of the composition, or improving the composition in storage stability.

The glass transition temperature of the thermosetting resin in the present invention is preferably from 120 to 250° C., more preferably from 140 to 210° C. to cause the resultant composite material to ensure a sufficient heat resistance and hygrothermal-compression strength required for an airplane material. In order to cure and molde such a thermosetting resin, which is relatively high in heat resistance, and a prepreg using this resin, a relatively high curing temperature is required. About prepregs used at present as a structural material for the body of an airplane, the curing and molding temperature thereof is generally in the range of 180±10° C. Furthermore, in order to cause a fiber-reinforced composite material obtained by curing and molding any prepreg laminated product to exhibit a sufficient strength, the curing and molding of the prepreg laminated product are conducted generally under a pressurizing condition that the pressure is 1 atmospheric pressure or more.

In the present invention, the thermoplastic resin particles [C], which are insoluble in the thermosetting resin [B], need to satisfy the following (i) and (ii) in terms of dynamic viscoelasticity behavior:

(i) the storage elastic modulus G' of the material constituting the particles is more than 1 MPa, and 70 MPa or less at 180° C., and (ii) the ratio of the storage elastic modulus G' of the material constituting the particles at 160° C. to the storage elastic modulus G' of the material at 200° C. ranges from 1 to 5.

The wording "resin particles, which are insoluble in the thermosetting resin" denotes that the resin particles are not substantially soluble in the epoxy resin when the thermosetting resin in which the resin particles are dispersed is heated and cured. The undissolution is understandable by a matter that the following is observable through a transmission electron microscope: clear interfaces between the particles and the matrix resin in the state that the particles do not substantially shrink from the original size thereof in the epoxy resin cured product.

The inventors have found out that when the thermoplastic resin particles [C], which are insoluble in the thermosetting resin [B], have the features (i) and (ii), the thermoplastic resin particles are appropriately deformed in a fiber-reinforced composite material obtained by laminating the prepregs and curing and molding the resultant laminate; the deformation makes it possible that the composite material keeps, between its layers, high-rigidity regions while the regions between the layers are made high in particle concentration; and further even when conditions for the molding are varied, the conformation of the interlamilar regions can be maintained.

In the fiber-reinforced composite material obtained by the curing, the following may be present between two or more layers containing, as main components thereof, a reinforcement fiber [A] that will be detailed later, and the thermosetting resin [B] (hereinafter such layers may be referred to as "fiber layers"): a resin layer containing, as main components thereof, the thermoplastic resin particles [C] and the thermosetting resin [B] (hereinafter such a resin layer may be represented by the word "intralaminar" or referred to as "an intralaminar region", which means a layer or region "between the fiber layers"). In a case where the storage elastic modulus G' of the thermoplastic resin particles [C] is more than 1 MPa, and 70 MPa or less at 180° C., preferably more than 1 MPa, and 40 MPa or less at 180° C., the particles can be appropriately deformed at the time of molding the laminated product of the prepregs under high-temperature pressurizing conditions of a temperature of about 180° C. and a pressure of 0.1 to 0.6 MPa. Moreover, at this time, the intralaminar thermoplastic resin particles [C] can be heightened in concentration while the existence of the resin layer is certainly kept. If the storage elastic modulus G' is low at 180° C., the particles are deformed to such a degree that the particles cannot keep the mold thereof at the molding time under the high-temperature and pressurizing conditions. Thus, the molded material comes not to keep the conformation of its intralaminar regions. As a result, the resultant fiber-reinforced composite material may be lowered in strength and interlaminar fracture toughness. If the storage elastic modulus G' at 180° C. is larger than 70 MPa, the particles are too high in rigidity at 180° C. not to be easily deformed so that the resultant molded material is not improved in intralaminar particle concentration. When the storage elastic modulus G' is in the above-mentioned range at 180° C., the particles in the intralaminar regions are appropriately deformed to produce a tendency that the particle concentration is improved in the intralaminar regions and further improved in interfaces between the fiber layers and the intralaminar regions. As a result, when a falling-weight impact is applied to the fiber-reinforced composite material, a damage of the material can be effectively restrained from being enlarged.

When the ratio of the storage elastic modulus G' at 160° C. to the storage elastic modulus G' at 200° C., that is, the ratio of [the storage elastic modulus G' at 160° C.]/[the storage elastic modulus G' at 200° C.] ranges from 1 to 5, the intralaminar regions, where the particle concentration is relatively high, can be stably formed even when the molding conditions are varied. If the storage elastic modulus ratio is too large, the following drawbacks may be caused when the temperature-raising rate in the molding is changed into a small value, or when the curing method to be used is changed to a step-curing method of curing the composite-material workpiece up to about 50% at 150° C., raising the temperature to 180° C., and further curing the workpiece: the particle concentration is largely lowered from that in the intralaminar regions obtained under the molding conditions before the change. Conversely, if the temperature-raising rate in the molding is made large, the particle concentration may be varied into a higher level than that in the intralaminar regions obtained under the molding conditions before the rate is made large Any one of these cases may make it possible to change the fiber-reinforced composite material in properties. As the storage elastic modulus ratio is closer to a value of 1, a change depending on the molding conditions tends to be smaller. This is a preferred embodiment.

The storage elastic modulus G', referred to herein, of the material that constitutes particles is a value measured as follows: The particles are press-formed at 270° C. into the form of a plate having a thickness of about 2 mm. This plate is worked into a test piece having a width of 12±1 mm, and a length of 30 to 40 mm. The test piece is heated at 180° C. under a normal pressure for 2 hours not to be deformed, and then the dynamic viscoelasticity thereof is measured, using a dynamic viscoelasticity measuring instrument at a temperature-raising rate of 5° C./minute. The heating of the test piece at 180° C. for 2 hours is to measure the intrinsic elastic modulus of the particles, from which the effect of thermal hysteresis in the press-formation is removed. When the particles are particles having a measured melting point of 270° C. or higher, the particles are press-formed at a temperature 10° C. higher than the melting point, so as to be molded into a plate form.

About the thermoplastic resin particles [C] in the present invention, the glass transition temperature thereof ranges preferably from 80 to 180° C. If this glass transition temperature is too low, a fiber-reinforced composite material may be produced which is insufficient in balance between interlaminar fracture toughness and hygrothermal-compression strength. The temperature is more preferably 100° C. or higher, even more preferably 130° C. or higher. However, if this glass transition temperature is too high, the resin particles themselves tend to be short in toughness, and further the interfacial bondability between the resin particles and the matrix resin is insufficient so that a fiber-reinforced composite material is produced with an insufficient interlaminar fracture toughness. The temperature is more preferably 160° C. or lower, even more preferably 155° C. or lower. When the glass transition temperature is set to such a relatively high value, a fiber-reinforced composite material can be obtained which can stably ensure hygrothermal-compression strength required for airplane material.

The material of the thermoplastic resin particles [C] in the present invention is not particularly limited. Specific examples thereof include vinyl polymers, polyesters, polyamdies, polyarylene ethers, polyarylene sulfides, polyethersulfones, polysulfones, polyetherketones, polyetheretherketones, polyurethanes, polycarbonates, polyamideimides, polyimides, polyetherimides, polyacetals and silicones; and respective copolymers thereof.

One or more of these resins are usable. Of these resins, polyamides are preferred since the polymers are high in elongation, toughness, and bondability to thermosetting resin. The polyamides may be polyamides each obtained by polycondensing (molecules of) a lactam having three- or more-membered ring, a polymerizable aminocarboxylic acid, or a bibasic acid and a diamine, or a salt made from the two compounds; or a mixture of two or more of these monomer.

The thermoplastic resin particles [C] in the present invention may be made of a blend composition of at least one polymer having crystallinity and at least one non-crystalline polymer.

In the present invention, the "non-crystalline polymer" denotes a polymer in which the proportion of one or more crystalline phases is zero, or is smaller than that of one or more non-crystalline phases. The crystalline polymer and the non-crystalline polymer can be distinguished from each other by a differential scanning calorimetric method (DSC method) or a dynamic viscoelasticity analytic method (DMA method). Specifically, when a polymer is measured through a differential scanning calorimetric instrument (DSC), this polymer is represented as a non-crystalline polymer in a case where no melting heat is measured or a crystal melting heat of 5 J/g or more is not shown. At this time, in the DSC measurement, in a temperature range from 30° C. to a temperature 30° C. higher than the melting point of the polymer, the temperature of the polymer is once raised at a temperature-raising range of 20° C./minute; the polymer is then kept for 1 minute; the temperature of the polymer is then lowered to 0° C. at 20° C./minute; the polymer is then kept for 1 minute; and the temperature of the polymer is again raised at 20° C./minute. By this method, the polymer is measured, and the melting heat measured at the second temperature-raising time is regarded as the crystal melting heat of the polymer. When a crystallization heat is measured at the second temperature-raising time, a value obtained by subtracting the crystallization heat from the melting heat is defined as the melting heat referred to herein.

The "crystalline polymer" denotes a polymer showing a crystal melting heat 5 J/g or more in the above-mentioned DSC measurement.

Examples of the crystalline polymer include polyesters, polyamides, polyphenylene sulfides, polyetherketones, polyetheretherketones, and polyurethanes. Examples of the non-crystalline polymer include vinyl polymers such as polyacrylonitrile, non-crystalline polyesters, non-crystalline polyamides, polyethersulfones, polysulfones, and polycarbonates.

Of these resins, polyamides are preferred since the polymers are high in elongation, toughness, and bondability to thermosetting resin. The thermoplastic resin particles [C] in the present invention more preferably contain, as a component thereof, at least one of a crystalline polyamide and an non-crystalline polyamide.

Examples of the non-crystalline polyamide include a copolymer made from 3,3'-dimethyl-4,4'-diaminodicyclohexylmethane, isophthalic acid, and 12-aminododecanoic acid (for example, "Grilamid (registered trade name)" TR55, manufactured by EMS-Chemie Japan Ltd.); and a copolymer made from 3,3'-dimethyl-4,4'-diaminodicyclohexylmethane and dodecanoic diacid (for example, "Grilamid (registered trade name)" TR90, manufactured by EMS-Chemie Japan Ltd.).

In the present invention, the ratio by mass in the blend composition ranges preferably from 19/1 to 1/19, more preferably from 7/3 to 1/19. When the ratio is in this range, the composite material can keep the conformation of the intralaminar regions even when the molding conditions are varied, so that the composite material can gain stable intralaminar fracture toughness and impact resistance.

The ratio in the blend composition in the present invention can be identified by an infrared ray spectrometric method (IR method) or a nuclear magnetic resonance spectroscopic method (NMR method) of particles extracted from the prepreg with, for example, an organic solvent. When the particles are measured using, for example, the IR method, the ratio is calculated out from the ratio by area between respective peaks of absorption bands corresponding to the individual polymer.

In the present invention, the method for producing the thermoplastic resin particles [C] is not particularly limited. Thus, various known methods are usable. Example thereof include a method of using, for example, liquid nitrogen to freeze the raw materials, and then pulverizing the frozen materials mechanically to yield fine particles; a method of dissolving the raw material into a solvent, and then spray-drying the solution; a method of dissolving the raw materials into a solvent, and then subjecting the solution to re-precipitation or re-coagulation in a poor solvent; and a forced melt-kneading emulsification of kneading mechanically the resin component(s) to be made into particles, and the resin component(s) different therefrom to forma sea-island structure, and then removing the sea component(s) thereof with a solvent. By classifying the resultant particles, only particles having a particle diameter in a desired particle diameter range are usable.

In the case of producing particles containing, as components thereof, two or more polymers, a method out of various methods is usable, correspondingly to a method for producing the particles. The methods are, for example, a method of using a blend composition obtained by melt-kneading, and a method of dissolving each of the polymers into a solvent, and then mixing the resultant solutions with each other.

About the thermoplastic resin particles [C] in the present invention, the sphericity thereof is preferably from 90 to 100. By adjusting the sphericity into such a high level, the viscosity of the epoxy resin composition in which the resin particles are dispersed can be controlled into a low level, and the blend proportion of the resin particles can be increased accordingly. If the sphericity is less than 90, the epoxy resin composition rises in viscosity so that the blend proportion of the resin particles may be restricted.

The sphericity is calculated out by observing the particles through a scanning electron microscope, measuring the respective short and long diameters of the particles, calculating the respective averages of 30 particles selected at random from the particles, and then applying the respective averages to the following numerical value conversion equation:

$$\text{Sphericity} = \frac{\sum_{i=1}^{n}(\text{Short diameter}/\text{Long diameter})}{n} \times 100 \quad [\text{Math. 1}]$$

In the equation, n is the number of the measured particles, and is 30 in this embodiment.

About the thermoplastic resin particles [C] in the present invention, the average particle diameter is preferably from 0.1 to 150 µm. The average particle diameter denotes the number-average particle diameter of the particles. By adjusting the average particle diameter into the range, the following advantage is obtained in a fiber-reinforced composite material obtained by laminating prepregs in each of which the resin-particle-dispersed epoxy resin composition is combined with a reinforcement fiber onto each other, and then heating the laminate to be cured: the obtained fiber-reinforced composite material can be a material having an even intralaminar-thickness without the resin particles being shifted into the reinforcement fiber layers, and without any region in which an excessive intralaminar-thickness is exhibited by the presence of coarse ones out of the particles being generated. As a result, the composite material is stably high in intralaminar fracture toughness. If the average particle diameter is too large, the filament-arrangement of the carbon fiber is disturbed by the presence of large-diameter ones out of the particles. Alternatively, the fiber-reinforced composite material, which is yielded by laminating the prepregs, becomes large in thickness, and thus the content by percentage of the volume of the fiber is relatively lowered so that the composite material may be lowered in mechanical properties. If the average particle diameter is too small, some of the particles are shifted to between the filaments of the carbon fiber so that the composite material may be lowered in impact resistance or other mechanical properties. The average particle diameter is more preferably from 1 to 70 µm, even more preferably from 3 to 40 µm.

It is advisable to set the content by percentage of the thermoplastic resin particles [C], which are insoluble in the thermosetting resin [B], to 1% or more by mass, preferably 2% or more by mass in order for the composite material to gain a high intralaminar fracture toughness and impact resistance. In order for the prepreg(s) to ensure tackiness and drape, the content is preferably 20% or less by mass, more preferably 15% or less by mass.

The content by percentage of the thermoplastic resin particles [C] in the prepreg of the present invention is estimated as follows. A solvent is initially selected in which the thermosetting resin [B] is soluble but the thermoplastic resin particles [C] are insoluble. This solvent is put into a beaker, and the prepreg, the mass of which has been measured, is immersed in the solvent. An ultrasonic cleaner is used to dissolve the resin therein, and then filaments of the reinforcement fiber are picked up with tweezers. The remaining solution is filtrated on/through a membrane filter the mass of which has been beforehand measured. The thermoplastic resin particles [C] are filtrated off on the filter, and the dissolved resin, together with the solvent, passes through the filter. Next, the reinforcement fiber filaments picked up with the tweezers are returned to the original beaker. The reinforcement fiber is washed with the same solvent in the beaker, and the wash liquid is filtrated through the filter. This operation is repeated several times. The reinforcement fiber, the washing of which has been finished, is taken out, and then the inner wall of the beaker is washed with the same solvent several times to cause the thermoplastic resin particles [C] not to remain in the beaker. The wash liquid is then filtrated. The filter on which the thermoplastic resin particles [C] are filtrated off is folded in four, and then dried in an oven. The mass of the filter is then measured. The value obtained by subtracting the original filter mass from the measured mass is the mass of the particles. The content by percentage of the thermoplastic resin particles [C] can be calculated from the ratio between this particle mass and the original mass of the prepreg.

In the prepreg of the present invention, a single particle species may be used or plural particle species may be used for the thermoplastic resin particles [C]. A particulate component which does not fall in the scope of the particles [C] is together usable as far as the component does not hinder the advantageous effects of the present invention.

One or more of the following components may be blended into the prepreg of the present invention as far as the component(s) do(es) not hinder the advantageous effects of the present invention: a coupling agent, thermosetting resin particles, a thermoplastic resin soluble in the epoxy resin, and inorganic fillers such as silica gel, carbon black, clay, carbon nanotube, and metal powder.

The prepreg of the present invention is a product obtained by impregnating a reinforcement fiber [A] with a thermosetting resin composition having a thermosetting resin [B] and thermoplastic resin particles [C] as have been described above. Examples of the reinforcement fiber usable in the prepreg of the present invention include carbon fiber, glass fiber, aramid fiber, boron fiber, PBO fiber, high-strength polyethylene fiber, alumina fiber, and carbon silicon fiber. These fibers are usable in the form of a mixture of two or more thereof. The form of the reinforcement fiber, and the filament-arrangement thereof are not limited. The reinforcement fiber may have a fibrous structure such as a long fiber in which filaments are arranged in one direction, a single tow, woven fabric, knitting, nonwoven fabric, a mat or a braid.

Carbon fiber is preferably usable, in particular, for articles highly required to be decreased in raw-material-weight and be increased in strength, since the fiber is excellent in specific modulus and specific strength.

A preferred type of carbon fiber in the present invention may be selected from all types of carbon fiber in accordance with the usage thereof, and may be a carbon fiber having a tensile elasticity of at highest 400 GPa from the viewpoint of intralaminar fracture toughness and impact resistance. From the viewpoint of strength, the carbon fiber usable in the invention is preferably a fiber having a tensile strength of 4.4 to 6.5 GPa since the carbon fiber can give a composite material having a high rigidity and mechanical strength. The carbon fiber is also preferably a high-strength and high-elongation carbon fiber having a tensile elongation of 1.7 to 2.3% since the tensile elongation of the fiber is an important factor. Accordingly, the carbon fiber is most preferably a fiber having all of a tensile elasticity of 230 GPa or more, a tensile strength of 4.4 GPa or more, and a tensile elongation of 1.7% or more.

Examples of a commercially available product of carbon fiber include products "TORAYCA (registered trade name) " T800G-24K, "TORAYCA (registered trade name) " T800S-24K, "TORAYCA (registered trade name) " T700G-24K, "TORAYCA (registered trade name) " T300-3K, and "TORAYCA(registered trade name) " T700S-12K (each manufactured by Toray Industries, Inc.).

The form and filament-arrangement of carbon fiber is appropriately selectable from those of long filaments arranged in one direction and woven fabrics, and others. In order to give a carbon fiber reinforced composite material having a small weight and a higher-level endurance, preferred is the form of a continuous fiber, such as filaments (fiber bundle) arranged in one direction or woven fabric.

About carbon fiber bundles usable preferably in the present invention, the monofilament fineness thereof is preferably from 0.2 to 2.0 dtex, more preferably from 0.4 to 1.8 dtex. If the monofilament fineness is too small, the carbon fiber bundles may contact a guide roller to be easily damaged when twisted. Moreover, the same damage may be caused in the step of the impregnation with the resin composition. If the monofilament fineness is too large, the carbon fiber bundles may not be sufficiently impregnated with the resin composition, so that the resultant prepreg may be lowered in fatigue resistance.

About the carbon fiber bundles usable preferably in the present invention, the number of the filaments in each of the bundles preferably ranges from 2500 to 50000. If the number of the filaments is too small, the respective arrangements of the filaments are easily meandered to lower the resultant in strength. If the number of the filaments is too large, the impregnation with the resin may be difficult when the prepreg is produced, or the molde thereof is formed. The number of the filaments ranges more preferably from 2800 to 40000.

The prepreg of the present invention is preferably a prepreg in which the reinforcement fiber [A]is impregnated with a resin composition containing the thermosetting resin [B] and the thermoplastic resin particles [C]. The proportion by mass of the fibers in the prepreg is preferably from 40 to 90% by mass, more preferably from 50 to 80% by mass. If the fiber proportion by mass is too low, the resultant fiber-reinforced composite material increases excessively in mass so that advantages of the fiber-reinforced composite material, which is excellent in specific strength and specific modulus, may be damaged. If the fiber proportion by mass is too high, a failure may be generated in the impregnation with the resin composition so that the fiber-reinforced composite material easily contains many voids to be largely lowered in mechanical properties.

The prepreg of the present invention preferably has a structure having moieties in which a layer rich in particles is formed, the moieties being in the vicinity of the outer surface of the prepreg. This layer is specifically a layer about which at the time of observing a cross section of the layer, the state that the thermoplastic resin particles [C] are locally present is clearly verified (hereinafter, such a layer may be referred to as a particle layer).

When prepregs of the present invention are laminated onto each other and then the laminate is cured to produce a fiber-reinforced composite material, the structure described just above makes it easy to form, between the fiber layers, intralaminar regions composed of the thermoplastic resin particles [C] and the thermosetting resin [B] In this way, the fiber-reinforced composite material comes to exhibit a high-level intralaminar fracture toughness and impact resistance.

From such a viewpoint, in the case of the prepregs which each have two opposed surfaces on each of which a particle layer as described above is formed, it is preferred that the particle layer is present in each of the surfaces of the prepreg and inside a region of the prepreg that extends from the surface toward the thickness direction of the prepreg by a depth of 20% of the prepreg thickness, the proportion of the thickness being 100%, preferably by 10% thereof. The particle layer may be caused to be present in only one of the two surfaces. In the case of this prepreg, in which the particle layer is present in only one of the two surfaces, it is preferred that the particle layer is present in the one surface and inside a region of the prepreg that extends from the one surface toward the thickness direction of the prepreg by a depth of 20% of the prepreg thickness, the proportion of the thickness being 100%, preferably by 10% thereof. When this prepreg, in which the particle layer is present in the one surface, is used, front and rear sides are produced in the prepreg. It is therefore necessary to pay attention. If such prepregs are laminated onto each other in a wrong form to form an intralaminar region having particles, and an intralaminar region having no particles, a composite material low in intralaminar fracture toughness is produced. In order to laminate the prepregs easily onto each other without the front and rear sides of each of the prepregs being distinguished from each other, it is preferred that the particle layer is present on each of the two opposed surfaces of the prepreg.

Furthermore, the presence ratio of the thermoplastic resin particles [C] present inside the region of the prepreg that extends from any outer surface of the prepreg to a prepreg site having a depth of 20% of the prepreg thickness is preferably from 90 to 100% by mass, more preferably from 95 to 100% by mass of the whole of the thermoplastic resin particles [C], the proportion of the mass of the whole being 100%.

This presence ratio of the particles can be estimated by, for example, the following method: The prepreg is sandwiched between two polytetrafluoroethylene resin plates each having flat and smooth surfaces to be caused to adhere closely onto each other. The temperature of the resultant workpiece is gradually raised to a curing temperature of the material of the prepregs over 7 days to gelatinize and cure the prepreg. In this way, a plate-form prepreg cured product is produced. A cross section of the resultant cured product is photographed through a microscope. When the prepreg is a prepreg which has two opposed surfaces on each of which a particle layer is present, the sectional photograph is used and lines parallel to the respective surfaces of the prepreg are drawn, the total number of the lines is two. Each of the lines is drawn at a site of the prepreg that has, from the corresponding surface of the two surfaces of the prepreg, a depth of 20% of the prepreg thickness. Next, the following are gained: the total area of the thermoplastic resin particles [C] present between each of the surfaces of the prepreg and the line corresponding to the surface; and the total area of the thermoplastic resin particles [C] present over the entire prepreg thickness. A calculation is then made about the presence ratio of the thermoplastic resin particles [C] present in the region extending from each of the surfaces of the prepreg to the prepreg site having the depth of 20% of the prepreg thickness, the proportion of this thickness being 100%.

When the prepreg of the present invention is a prepreg having, on a single surface thereof, a particle layer, a line parallel to the corresponding surface of a cured product of the prepreg is drawn, the line being drawn at a site of the product that has, from the surface of the prepreg cured product, a depth of 20% of the thickness. Next, the following are gained: the total area of the thermoplastic resin particles [C] present between the surface of the prepreg and the line; and the total area of the thermoplastic resin particles [C] present over the entire prepreg thickness. A calculation is then made about the presence ratio of the thermoplastic resin particles [C] present in the region extending from the surface of the prepreg to the prepreg site having the depth of 20% of the prepreg thickness, the proportion of this thickness being 100%. The area of the particles is obtained by gouging out portions of the particles from the sectional photograph, and then making a conversion calculation from the area thereof. The area may be measured, using an ordinarily usable image processing software. When the particles dispersed in the resin are not easily identified in the sectional photograph, the particles may be dyed before the photograph is taken.

The prepreg of the present invention can be produced by use or application of a method as disclosed in Japanese Unexamined Patent Application Publication No. Hei 01-26651, Japanese Unexamined Patent Application Publication No. Sho 63-170427, or Japanese Unexamined Patent Application Publication No. Sho 63-170428. Specifically, the prepreg can be produced by a method of painting the thermoplastic resin particles [C] onto the outer surface of a primary prepreg made of the reinforcement fiber [A], and the thermosetting resin [B], which is a matrix resin, in the state of keeping the form of the particles [C]; a method of preparing a mixture in which the thermoplastic resin particles [C] are homogenously blended into the thermosetting resin [B], which is a matrix resin, and then impregnating the reinforcement fiber [A] with this mixture, the invasion of the thermoplastic resin particles [C] in this impregnating step being blocked by the reinforcement fiber [A] to localize the thermoplastic resin particles [C] into outer surface regions of the prepreg; or a method of impregnating the reinforcement fiber [A] beforehand with the thermosetting resin [B] to produce a primary prepreg, and bonding, onto the outer surface of the primary prepreg, a film of the thermosetting resin [B] that contains the thermoplastic resin particles [C] in a high concentration. When the thermoplastic resin particles [C] are present in a high concentration inside a region extending from the outer surface of the prepreg to a prepreg site having a depth of 20% of the prepreg thickness, the prepreg can be obtained for a fiber-reinforced composite material high in interlaminar fracture toughness.

When the prepreg is in such a form that on/in the outer surface, the thermosetting resin [B] is present together with the thermoplastic resin particles [C], the prepreg is excellent in tackiness, handleability and others.

The prepreg of the present invention can be favorably produced by, for example, a wet method of dissolving a resin composition containing the thermosetting resin [B] into a solvent such as methyl ethyl ketone or methanol to be made low in viscosity, and then impregnating the reinforcement fiber [A] with this solution, or a hot melt method of heating a resin composition containing the thermosetting resin [B] to be made low in viscosity, and then impregnating the reinforcement fiber [A] with the resin [B].

The wet method is a method of immersing the reinforcement fiber [A] into the resin composition containing the thermosetting resin [B], pulling up the fiber [A], and then using, e.g., an oven to vaporize the solvent to yield a prepreg.

The hot melt method is a method of impregnating the reinforcement fiber [A] directly with the resin composition containing the thermosetting resin [B], which has been made low in viscosity by heating, or a method of producing one or more resin films in which, e.g., a release paper piece is coated with the resin composition containing the thermosetting resin [B], next putting the resin film(s) onto the reinforcement fiber from both sides thereof or a single side thereof, and then heating and pressurizing the workpiece to impregnate the film(s) with the resin composition containing the thermosetting resin [B] by the transcription of this composition, thereby yielding a prepreg or prepregs. This hot melt method is a preferred embodiment since the solvent does not substantially remain in the prepreg(s) at all.

The prepreg of the present invention may contain any material other than the materials [A], [B] and [C] as far as the advantageous effects of the present invention are not damaged.

Next, the fiber-reinforced composite material of the present invention will be described. The material can be produced by, for example, a method of laminating prepregs as described above onto each other, and then heating and curing the thermosetting resin [B] while giving heat and pressure to the resultant laminate.

The method for giving the heat and pressure may be, for example, press forming, autoclave forming, bagging molding, a wrapping tape method, or internal pressure forming. In order to mold, particularly, a sporting product, it is preferred to use the wrapping tape method and internal pressure forming.

The wrapping tape method is a method of winding the prepreg onto a metallic core of, e.g., a mandrel, to form a tubular body made of the fiber-reinforced composite material. The method is suitable for producing a rod-form body such as a golf shaft or a fishing rod. More specifically, the method is a method of winding the prepreg onto a mandrel, winding a wrapping tape which is a thermoplastic resin film onto the outside of the prepreg to fix the prepreg and pressurize the prepreg, heating and curing the thermosetting resin in an oven, and then pulling out the metallic core therefrom to yield a tubular body.

The internal forming is a method of setting, into a mold, a preform in which the prepreg is wound onto an internal pressure supplier such as a tube made of a thermoplastic resin, and next introducing gas having a high pressure into the internal pressure supplier and simultaneously heating the mold to form a tubular body. This internal forming is in particular preferably usable to form complicated-molded products such as a golf shaft, a bat, and rackets for tennis, badminton and others.

The fiber-reinforced composite material of the present invention can be produced by, for example, a method of laminating the prepregs of the invention onto each other into a predetermined form, and pressurizing and heating the laminate to cure the thermosetting resin.

About the fiber-reinforced composite material of the present invention, by use of the thermoplastic resin particles [C], which are insoluble in the thermosetting resin [B], satisfying the above-mentioned conditions (i) to (ii) simultaneously, the particle concentration of the thermoplastic resin particles [C] is made high in regions between the fiber layers, or fiber-intralaminar regions. Accordingly, a fiber-reinforced composite material relatively small in intralaminar region thickness (hereinafter referred to also as the intralaminar thickness) can be obtained even when the thermoplastic resin particles [C] are, between the layers, located in an amount equivalent to that in the prior art. As a result, the composite material is improved in impact resistance. This intralaminar thickness is preferably 20 µm or more, more preferably 25 µm or more while the thickness is preferably 35 µm or less, more preferably 33 µm or less. This intralaminar thickness is measurable in accordance with, for example, the following steps. The fiber-reinforced composite material is cut in a direction orthogonal to the reinforcement fiber filaments, and a cross section thereof is polished and then enlarged at 200× magnification or more through an optical microscope to be photographed. About a fiber-intralaminar region selected at random from the photograph, as a boundary line between the fiber-intralaminar region and the fiber layer region, a line is drawn in parallel to the fiber layer to set the content by volume of the reinforcement fiber in the selected region to 50%. The boundary line is drawn so as to be averaged over a length of 100 µm. The distance therebetween is defined as the intralaminar thickness.

EXAMPLES

Hereinafter, the prepreg and the fiber-reinforced composite material of the present invention will be more specifically described by way of working examples thereof. Resin materials used in the examples, respective methods for producing and evaluating prepregs and fiber-reinforced composite materials used therein are described below. The production and the evaluation of the prepregs of the examples were performed in an environment having an atmosphere having a temperature of 25° C.±2° C. and a relative humidity of 50% unless otherwise specified. About any composition component ratio shown in Tables 1 and 2, and others, the unit of the amount of each of the components therein is "part(s)". The wording "part(s)" means part(s) by mass unless otherwise specified. The present invention is not limited to these examples.

<Reinforcement Fiber [A]: Carbon Fiber>

"TORAYCA (registered trade name) " T800G-24K-31E (manufactured by Toray Industries, Inc.; carbon fiber with the number of filaments: 24,000, tensile strength: 5.9 GPa, tensile elasticity: 294 GPa, and tensile elongation: 2.0%).

<Thermosetting resins [B]: epoxy resins>"SUMIEPDXY (registered trade name) " ELM434 (tetraglycidyldiaminodiphenylmethane, manufactured by Sumitomo Chemical Co., Ltd.), "Araldite(registered trade name) " MY0600 (m-aminophenol type epoxy resin, manufactured by Huntsman Advanced Material LLC; epoxy equivalent: 118), and "EPICLON(registered trade name) " 830 (bisphenol F type epoxy resin, manufactured by DIC Corp.).

<Curing Agent: Epoxy Resin Curing Agent>

3,3'-DAS (3,3'-diaminodiphenylsulfone, manufactured by Mitsui Fine Chemical, Inc.).

<Other Component>

"SUMIKAEXCEL(registered trade name) " PES5003P (polyethersulfone, manufactured by Sumitomo Chemical Co., Ltd.).

<Thermoplastic Resin Particles [C]>

Materials (polymers) that may constitute any one of the particle species:

"TROGAMID(registered trade name) " CX7323 (crystalline polyamide, manufactured by Daicel Evonik Ltd.; melting point: 250° C., and glass transition temperature: 137° C.), "TROGAMID(registered trade name) " CX9701 (crystalline polyamide, manufactured by Daicel Evonik Ltd.; melting point: 250° C., and glass transition temperature: 138° C.), "Grilamid(registered trade name) " TR90 (non-crystalline polyamide, manufactured by EMS-Chemie Japan Ltd.; melting glass transition temperature: 153° C.), and "Grilamid(registered trade name) " TR55 (non-crystalline polyamide, manufactured by EMS-Chemie Japan Ltd.; melting glass transition temperature: 157° C.)

Particles 1 (produced using, as raw materials, the resins "TROGAMID(registered trade name) " CX7323 and "Grilamid (registered trade name) " TR90, and having an average particle diameter of 13 μm, a particle diameter distribution of 1.19, and a sphericity of 95).

Method for Producing the Particles 1:

The following were added into a 1000-mL pressure-resistant glass autoclave ("HYPER GLASSTER (registered trade name) " TEM-V1000N, manufactured by TAIATSU Techno Co., Ltd.): 22.0 g of the crystalline polyamide (TROGAMID (registered trade name) " CX7323), manufactured by Daicel Evonik Ltd.); 9.0 g of the non-crystalline polyamide ("Grilamid (registered trade name) " TR90), manufactured by EMS-Chemie Japan Ltd.); 42.0 g of polyvinyl alcohol ("GOHSENOL(registered trade name) " GM-14, manufactured by the Nippon Synthetic Chemical Industry Co., Ltd.); and 277.0 g of N-methyl-2-pyrrolidone as an organic solvent. The inside of the autoclave was purged with nitrogen to have a nitrogen concentration of 99% or more by volume. The system was then heated to 180° C., and then stirred for 2 hours until the polymers were dissolved. At this time, the oxygen concentration was 1% or less according to calculation. Thereafter, 350.0 g of ion exchange water as a poor solvent was dropwise added thereto at a rate of 3.0 g/minute by way of a liquid sending pump. When about 200 g of the ion exchange water was added thereto, the system was changed into a white color. After the total amount of the water was poured thereinto and this operation was finished, the temperature was lowered while the system was stirred. The resultant suspension was filtrated. To the solid was added 700.0 g of ion exchange water to subject the solid to re-slurry washing. The solid separated by the filtration was vacuum-dried at 80° C. for 10 hours to yield 30.3 g of a white solid. The resultant powder was observed through a scanning electron microscope. As a result, the powder was in the form of fine completely-spherical particles. The particles were fine resin particles having an average particle diameter of 13 μm, a particle diameter distribution index of 1.19, and a sphericity of 95.

Particles 2 (produced using, as raw materials, the resins "TROGAMID(registered trade name) " CX7323 and "Grilamid (registered trade name) " TR90, and having an average particle diameter of 14 μm, a particle diameter distribution index of 1.18, and a sphericity of 94).

Method for Producing the Particles 2:

The following were added into a 1000-mL pressure-resistant glass autoclave ("HYPER GLASSTER (registered trade name)" TEM-V1000N, manufactured by TAIATSU Techno Co., Ltd.): 16.0 g of the crystalline polyamide (TROGAMID (registered trade name) " CX7323), manufactured by Daicel Evonik Ltd.); 16.0 g of the non-crystalline polyamide ("Grilamid (registered trade name) " TR90), manufactured by EMS-Chemie Japan Ltd.); 42.0 g of polyvinyl alcohol ("GOHSENOL(registered trade name) " GM-14, manufactured by the Nippon Synthetic Chemical Industry Co., Ltd.); and 277.0 g of N-methyl-2-pyrrolidone as an organic solvent. The inside of the autoclave was purged with nitrogen to have a nitrogen concentration of 99% or more by volume. The system was then heated to 180° C., and then stirred for 2 hours until the polymers were dissolved. At this time, the oxygen concentration was 1% or less according to calculation. Thereafter, 350.0 g of ion exchange water as a poor solvent was dropwise added thereto at a rate of 3.0 g/minute by way of a liquid sending pump. When about 200 g of the ion exchange water was added thereto, the system was changed into a white color. After the total amount of the water was poured thereinto and this operation was finished, the temperature was lowered while the system was stirred. The resultant suspension was filtrated. To the solid was added 700.0 g of ion exchange water to subject the solid to re-slurry washing. The solid separated by the filtration was vacuum-dried at 80° C. for 10 hours to yield 29.9 g of a white solid. The resultant powder was observed through a scanning electron microscope. As a result, the powder was in the form of fine completely-spherical particles. The particles were fine resin particles having an average particle diameter of 14 μm, a particle diameter distribution index of 1.18, and a sphericity of 94.

Particles 3 (produced using, as raw materials, the resins "TROGAMID (registered trade name) " CX7323 and "Grilamid (registerd trade name) " TR90, and having an average particle diameter of 7 μm, a particle diameter distribution index of 1.16, and a sphericity of 92).

Method for Producing the Particles 3:

The following were added into a 1000-mL pressure-resistant glass autoclave ("HYPER GLASSTER (registered trade name) " TEM-V1000N, manufactured by TAIATSU Techno Co., Ltd.): 10.5 g of the crystalline polyamide (TROGAMID (registered trade name) " CX7323), manufactured by Daicel Evonik Ltd.); 10.5 g of the non-crystalline polyamide ("Grilamid (registered trade name) " TR90), manufactured by EMS-Chemie Japan Ltd.); 42.0 g of polyvinyl alcohol ("GOHSENOL (registered trade name) " GM-14, manufactured by the Nippon Synthetic Chemical Industry Co., Ltd.); and 287.0 g of N-methyl-2-pyrrolidone as an organic solvent. The inside of the autoclave was purged with nitrogen to have a nitrogen concentration of 99% or more by volume. The system was then heated to 180° C., and then stirred for 2 hours until the polymers were dissolved. At this time, the oxygen concentration was 1% or less according to calculation. Thereafter, 350.0 g of ion exchange water as a poor solvent was dropwise added thereto at a rate of 3.0 g/minute by way of a liquid sending pump. When about 200 g of the ion exchange water was added thereto, the system was changed into a white color. After the total amount of the water was poured thereinto and this operation was finished, the temperature was lowered while the system was stirred. The resultant suspension was filtrated. To the solid was added 700.0 g of ion exchange water to subject the solid to re-slurry washing. The solid separated by the filtration was vacuum-dried at 80° C. for 10 hours to yield 19.6 g of a white solid. The resultant powder was observed through a scanning electron microscope. As a result, the powder was in the form of fine completely-spherical particles. The particles were fine resin particles having an average particle diameter of 7 μm, a particle diameter distribution index of 1.16, and a sphericity of 92.

Particles 4 (produced using, as raw materials, the resins "TROGAMID (registered trade name) " CX7323 and "Grilamid (registered trade name) " TR90, and having an average particle diameter of 26 μm, a particle diameter distribution index of 1.19, and a sphericity of 92).

Method for Producing the Particles 4:

The following were added into a 1000-mL pressure-resistant glass autoclave ("HYPER GLASSTER (registered trade name) " TEM-V1000N, manufactured by TAIATSU Techno Co., Ltd.): 8.5 g of the crystalline polyamide (TROGAMID (registered trade name) " CX7323), manufactured by Daicel Evonik Ltd.); 20.0 g of the non-crystalline polyamide ("Grilamid (registered trade name) " TR90), manufactured by EMS-Chemie Japan Ltd.); 18.0 g of polyvinyl alcohol ("GOHSENOL (registered trade name) " GM-14, manufactured by the Nippon Synthetic Chemical Industry Co., Ltd.); and 305.0 g of N-methyl-2-pyrrolidone as an organic solvent. The inside of the autoclave was purged with nitrogen to have a nitrogen concentration of 99% or more by volume. The system was then heated to 180° C., and then stirred for 2 hours until the polymers were dissolved. At this time, the oxygen concentration was 1% or less according to calculation. Thereafter, 350.0 g of ion exchange water as a poor solvent was dropwise added thereto at a rate of 3.0 g/minute by way of a liquid sending pump. When about 200 g of the ion exchange water was added thereto, the system was changed into a white color. After the total amount of the water was poured thereinto and this operation was finished, the temperature was lowered while the system was stirred. The resultant suspension was filtrated. To the solid was added 700.0 g of ion exchange water to subject the solid to re-slurry washing. The solid separated by the filtration was vacuum-dried at 80° C. for 10 hours to yield 26.6 g of a white solid. The resultant powder was observed through a scanning electron microscope. As a result, the powder was in the form of fine completely-spherical particles. The particles were fine resin particles having an average particle diameter of 26 particle distribution index of 1.19, and a sphericity of 92.

Particles 5 (produced using, as raw materials, the resins "TROGAMID (registered trade name) " CX7323 and "Grilamid (registered trade name) " TR55, and having an average particle diameter of 15 μm, a particle diameter distribution of 1.17, and a sphericity of 93).

Method for Producing the Particles 5:

The following were added into a 1000-mL pressure-resistant glass autoclave ("HYPER GLASSTER (registered trade name) " TEM-V1000N, manufactured by TAIATSU Techno Co., Ltd.): 16.0 g of the crystalline polyamide (TROGAMID (registered trade name) " CX7323), manufactured by Daicel Evonik Ltd.); 16.0 g of the non-crystalline polyamide ("Grilamid (registered trade name) " TR55), manufactured by EMS-Chemie Japan Ltd.); 42.0 g of polyvinyl alcohol ("GOHSENOL (registered trade name) " GM-14, manufactured by the Nippon Synthetic Chemical Industry Co., Ltd.); and 277.0 g of N-methyl-2-pyrrolidone as an organic solvent. The inside of the autoclave was purged with nitrogen to have a nitrogen concentration of 99% or more by volume. The system was then heated to 180° C., and then stirred for 2 hours until the polymers were dissolved. At this time, the oxygen concentration was 1% or less according to calculation. Thereafter, 350.0 g of ion exchange water as a poor solvent was dropwise added thereto at a rate of 3.0 g/minute by way of a liquid sending pump. When about 200 g of the ion exchange water was added thereto, the system was changed into a white color. After the total amount of the water was poured thereinto and this operation was finished, the temperature was lowered while the system was stirred. The resultant suspension was filtrated. To the solid was added 700.0 g of ion exchange water to subject the solid to re-slurry washing. The solid separated by the filtration was vacuum-dried at 80° C. for 10 hours to yield 30.2 g of a white solid. The resultant powder was observed through a scanning electron microscope. As a result, the powder was in the form of fine completely-spherical particles. The particles were fine resin particles having an average particle diameter of 15 μm, a particle diameter distribution index of 1.17, and a sphericity of 93.

Particles 6 (produced using, as raw materials, the resins "TROGAMID (registered trade name)" CX9701 and "Grilamid (registered trade name)" TR55, and having an average particle diameter of 16 μm, a particle diameter distribution of 1.20, and a sphericity of 94).

Method for Producing the Particles 6:

The following were added into a 1000-mL pressure-resistant glass autoclave ("HYPER GLASSTER (registered trade name) " TEM-V1000N, manufactured by TAIATSU Techno Co., Ltd.): 16.0 g of the crystalline polyamide (TROGAMID (registered trade name) " CX9701), manufactured by Daicel Evonik Ltd.); 16.0 g of the non-crystalline polyamide ("Grilamid (registerd trade name)" TR55), manufactured by EMS-Chemie Japan Ltd.); 42.0 g of polyvinyl alcohol ("GOHSENOL (registered trade name)" GM-14, manufactured by the Nippon Synthetic Chemical Industry Co., Ltd.); and 277.0 g of N-methyl-2-pyrrolidone as an organic solvent. The inside of the autoclave was purged with nitrogen to have a nitrogen concentration of 990 or more by volume. The system was then heated to 180° C., and then stirred for 2 hours until the polymers were dissolved. At this time, the oxygen concentration was 10 or less according to calculation. Thereafter, 350.0 g of ion exchange water as a poor solvent was dropwise added thereto at a rate of 3.0 g/minute by way of a liquid sending pump. When about 200 g of the ion exchange water was added thereto, the system was changed into a white color. After the total amount of the water was poured thereinto and this operation was finished, the temperature was lowered while the system was stirred. The resultant suspension was filtered. To the solid was added 700.0 g of ion exchange water to subject the solid to re-slurry washing. The solid separated by the filtration was vacuum-dried at 80° C. for 10 hours to yield 30.2 g of a white solid. The resultant powder was observed through a scanning electron microscope. As a result, the powder was in the form of fine completely-spherical particles. The particles were fine resin particles having an average particle diameter of 16 µm, a particle diameter distribution index of 1.20, and a sphericity of 94.

Particles 7 (produced using, as raw materials, the resins "TROGAMID (registered trade name) " CX7323 and "Grilamid (registered trade name) " TR90, and having an average particle diameter of 14 µm, a particle diameter distribution of 1.18, and a sphericity of 94).
Method for Producing the Particles 7:

The following were added into a 1000-mL pressure-resistant glass autoclave ("HYPER GLASSTER (registered trade name)" TEM-V1000N, manufactured by TAIATSU Techno Co., Ltd.): 4.2 g of the crystalline polyamide (TROGAMID (registered trade name)" CX7323), manufactured by Daicel Evonik Ltd.); 23.8 g of the non-crystalline polyamide ("Grilamid (registered trade name)" TR55), manufactured by EMS-Chemie Japan Ltd.); 42.0 g of polyvinyl alcohol ("GOHSENOL(registered trade name)" GM-14, manufactured by the Nippon Synthetic Chemical Industry Co., Ltd.); and 280.0 g of N-methyl-2-pyrrolidone as an organic solvent. The inside of the autoclave was purged with nitrogen to have a nitrogen concentration of 99% or more by volume. The system was then heated to 180° C., and then stirred for 2 hours until the polymers were dissolved. At this time, the oxygen concentration was 1% or less according to calculation. Thereafter, 350.0 g of ion exchange water as a poor solvent was dropwise added thereto at a rate of 3.0 g/minute by way of a liquid sending pump. When about 200 g of the ion exchange water was added thereto, the system was changed into a white color. After the total amount of the water was poured thereinto and this operation was finished, the temperature was lowered while the system was stirred. The resultant suspension was filtered. To the solid was added 700.0 g of ion exchange water to subject the solid tore-slurry washing. The solid separated by the filtration was vacuum-dried at 80° C. for 10 hours to yield 26.2 g of a white solid. The resultant powder was observed through a scanning electron microscope. As a result, the powder was in the form of fine completely-spherical particles. The particles were fine resin particles having an average particle diameter of 14 µm, a particle diameter distribution index of 1.17, and a sphericity of 94.

Particles 8 (produced using, as raw materials, the resins "TROGAMID (registered trade name)" CX7323 and "Grilamid (registered trade name) " TR90, and having an average particle diameter of 15 µm, a particle diameter distribution of 1.18, and a sphericity of 94).
Method for Producing the Particles 8:

The following were added into a 1000-mL pressure-resistant glass autoclave ("HYPER GLASSTER (registered trade name)" TEM-V1000N, manufactured by TAIATSU Techno Co., Ltd.): 1.4 g of the crystalline polyamide (TROGAMID (registered trade name)" CX7323), manufactured by Daicel Evonik Ltd.); 26.6 g of the non-crystalline polyamide ("Grilamid (registered trade name) " TR55), manufactured by EMS-Chemie Japan Ltd.); 42.0 g of polyvinyl alcohol ("GOHSENOL(registered trade name) " GM-14, manufactured by the Nippon Synthetic Chemical Industry Co., Ltd.); and 280.0 g of N-methyl-2-pyrrolidone as an organic solvent. The inside of the autoclave was purged with nitrogen to have a nitrogen concentration of 99% or more by volume. The system was then heated to 180° C., and then stirred for 2 hours until the polymers were dissolved. At this time, the oxygen concentration was 1% or less according to calculation. Thereafter, 350.0 g of ion exchange water as a poor solvent was dropwise added thereto at a rate of 3.0 g/minute by way of a liquid sending pump. When about 200 g of the ion exchange water was added thereto, the system was changed into a white color. After the total amount of the water was poured thereinto and this operation was finished, the temperature was lowered while the system was stirred. The resultant suspension was filtered. To the solid was added 700.0 g of ion exchange water to subject the solid to re-slurry washing. The solid separated by the filtration was vacuum-dried at 80° C. for 10 hours to yield 26.3 g of a white solid. The resultant powder was observed through a scanning electron microscope. As a result, the powder was in the form of fine completely-spherical particles. The particles were fine resin particles having an average particle diameter of 15 µm, a particle diameter distribution index of 1.18, and a sphericity of 94.

Particles 9 (produced using, as a raw material, the resins "TROGAMID (registered trade name) " CX7323, and having an average particle diameter of 15 µm, a particle diameter distribution index of 1.17, and a sphericity of 95).
Method for Producing the Particles 9:

The following were added into a 1000-mL pressure-resistant glass autoclave ("HYPER GLASSTER (registered trade name)" TEM-V1000N, manufactured by TAIATSU Techno Co., Ltd.): 28.0 g of "TROGAMID (registered trade name)" CX7323, manufactured by Daicel Evonik Ltd.; 21.0 g of polyvinyl alcohol ("GOHSENOL (registered trade name)" GM-14, manufactured by the Nippon Synthetic Chemical Industry Co., Ltd.); and 301.0 g of N-methyl-2-pyrrolidone as an organic solvent. The inside of the autoclave was purged with nitrogen to have a nitrogen concentration of 99% or more by volume. The system was then heated to 180° C., and then stirred for 2 hours until the polymers were dissolved. At this time, the oxygen concentration was 1% or less according to calculation. Thereafter, 350.0 g of ion exchange water as a poor solvent was dropwise added thereto at a rate of 3.0 g/minute by way of a liquid sending pump. When about 200 g of the ion exchange water was added thereto, the system was changed into a white color. After the total amount of the water was poured thereinto and this operation was finished, the temperature was lowered while the system was stirred. The resultant suspension was filtered. To the solid was added 700.0 g of ion exchange water to subject the solid to re-slurry washing. The solid separated by the filtration was vacuum-dried at 80° C. for 10 hours to yield 26.9 g of a white solid. The resultant powder was observed through a scanning electron microscope. As a result, the powder was in the form of fine completely-spherical particles. The particles were fine resin particles having an average particle diameter of 15 µm, a particle diameter distribution index of 1.17, and a sphericity of 95.

Particles 10 (produced using, as a raw material, the resins "Grilamid (registered trade name) " TR90, and having an average particle diameter of 15 μm, a particle diameter distribution index of 1.17, and a sphericity of 95).
Method for Producing the Particles 10:

The following were added into a 1000-mL pressure-resistant glass autoclave ("HYPER GLASSTER (registered trade name)" TEM-V1000N, manufactured by TAIATSU Techno Co., Ltd.): 28.0 g of "Grilamid(registered trade name) " TR90 manufactured by EMS-Chemie Japan Ltd.; 21.0 g of polyvinyl alcohol ("GOHSENOL(registered trade name)" GM-14, manufactured by the Nippon Synthetic Chemical Industry Co., Ltd.); and 301.0 g of N-methyl-2-pyrrolidone as an organic solvent. The inside of the autoclave was purged with nitrogen to have a nitrogen concentration of 99% or more by volume. The system was then heated to 180° C., and then stirred for 2 hours until the polymers were dissolved. At this time, the oxygen concentration was 1% or less according to calculation. Thereafter, 350.0 g of ion exchange water as a poor solvent was dropwise added thereto at a rate of 3.0 g/minute by way of a liquid sending pump. When about 200 g of the ion exchange water was added thereto, the system was changed into a white color. After the total amount of the water was poured thereinto and this operation was finished, the temperature was lowered while the system was stirred. The resultant suspension was filtrated. To the solid was added 700.0 g of ion exchange water to subject the solid to re-slurry washing. The solid separated by the filtration was vacuum-dried at 80° C. for 10 hours to yield 26.9 g of a white solid. The resultant powder was observed through a scanning electron microscope. As a result, the powder was in the form of fine completely-spherical particles. The particles were fine resin particles having an average particle diameter of 15 μm, a particle diameter distribution index of 1.17, and a sphericity of 95.

Particles 11 (produced using, as a raw material, the resins "Grilamid (registered trade name)" TR55, and having an average particle diameter of 15 μm, a particle diameter distribution index of 1.17, and a sphericity of 95).
Method for Producing the Particles 11:

The following were added into a 1000-mL pressure-resistant glass autoclave ("HYPER GLASSTER (registered trade name)" TEM-V1000N, manufactured by TAIATSU Techno Co., Ltd.): 28.0 g of "Grilamid (registered trade name) " TR55 manufactured by EMS-Chemie Japan Ltd.; 21.0 g of polyvinyl alcohol ("GOHSENOL(registered trade name)" GM-14, manufactured by the Nippon Synthetic Chemical Industry Co., Ltd.); and 301.0 g of N-methyl-2-pyrrolidone as an organic solvent. The inside of the autoclave was purged with nitrogen to have a nitrogen concentration of 99% or more by volume. The system was then heated to 180° C., and then stirred for 2 hours until the polymers were dissolved. At this time, the oxygen concentration was 1% or less according to calculation. Thereafter, 350.0 g of ion exchange water as a poor solvent was dropwise added thereto at a rate of 3.0 g/minute by way of a liquid sending pump. When about 200 g of the ion exchange water was added thereto, the system was changed into a white color. After the total amount of the water was poured thereinto and this operation was finished, the temperature was lowered while the system was stirred. The resultant suspension was filtrated. To the solid was added 700.0 g of ion exchange water to subject the solid to re-slurry washing. The solid separated by the filtration was vacuum-dried at 80° C. for 10 hours to yield 26.9 g of a white solid. The resultant powder was observed through a scanning electron microscope. As a result, the powder was in the form of fine completely-spherical particles. The particles were fine resin particles having an average particle diameter of 15 μm, a particle diameter distribution index of 1.17, and a sphericity of 95.

Particles 12 ("Orgasol(registered trade name)" 1002D, polyamide 6 particles manufactured by Arkema K.K.; particle diameter: 20 μm).

(1) Measurement of the average particle diameter, the particle diameter distribution index and the sphericity of the thermoplastic resin particles [C]

About the particle diameter of each particle of the thermoplastic resin particle [C], the particle was observed at 1000× magnification through a scanning electron microscope (scanning electron microscope JSM-6301NF, manufactured by JEOL Ltd.) to measure the diameter thereof. When the particle was not in a completely spherical form, the long diameter was measured as the particle diameter thereof.

About the average particle diameter of the individual particles, the respective diameters of 100 particles selected at random from the photograph were measured, and the arithmetic average thereof was calculated out to obtain this average particle diameter. The average particle diameter referred to herein was calculated out as the number-average particle diameter. The particle diameter distribution index, which shows the particle diameter distribution of the particles, was calculated out by applying the individual particle diameter values obtained as described above according to the following numerical value conversing equations:

$$Dn = \sum_{i=1}^{n} Di/n \quad \text{[Math. 2]}$$

$$Dv = \sum_{i=1}^{n} Di^4 \Big/ \sum_{i=1}^{n} Di^3$$

$$PDI = Dv/Dn$$

In the equations, Di: the particle diameter of any one of the particles; n: the number of the measured particles, 100, Dn: the number-average particle diameter thereof, Dv: the volume-average particle diameter thereof; and PDI: the particle diameter distribution index.

About the sphericity, the short and long diameters of each of 30 particles selected at random from the photograph are measured, and the average thereof is used to calculate out the sphericity in accordance with the following numerical equation:

$$\text{Sphericity} = \frac{\sum_{i=1}^{n} (\text{Short diameter/Long diameter})}{n} \times 100 \quad \text{[Math. 3]}$$

In the equation, n, which is the number of the measured particles, is set to 30.

(2) The measurement of the storage elastic modulus G' of the material constituting of the thermoplastic resin particle [C]

The particles were press-formed at 270° C. into the form of a plate having a thickness of about 2 mm. This was worked into a test piece having a width of 12±1 mm, and a length of 30 to 40 mm. The test piece was heated at 180° C. under a normal pressure for 2 hours not to be deformed, and then the dynamic viscoelasticity thereof was measured in a temperature range of 0 to 280° C., using a dynamic viscoelasticity measuring instrument at a temperature-raising rate of 5° C./minute. The heating of the test piece at 180° C. for 2 hours is to measure the intrinsic elastic modulus of the particles, from which the effect of thermal hysteresis in the press-formation is removed. Using values of (a) the storage elastic modulus G' at 180° C., (b) the storage elastic modulus G' at 160° C., and (c) the storage elastic modulus G' at 200° C., the ratio of the value (b)/the value (c) was obtained, which was the ratio of the storage elastic modulus G' at 160° C. to the storage elastic modulus G' at 200° C. The measuring instrument used was a dynamic viscoelasticity measuring instrument ARES-G2 manufactured by a company, TA Instruments.

(3) Measurement of the glass transition temperature (Tg) of the thermoplastic resin particle [C]

From the dynamic viscoelasticity curve obtained in the item (2), the following temperature was read out as the glass transition temperature thereof: the temperature of an intersection point obtained by extrapolating respective tangent lines of a glass region and a glass transition range in a storage elastic modulus-G'-to-temperature graph. In the present invention, comparison was made about the lowest transition range out of clear transition range that made their appearance in a temperature range of 0 to 280° C.

(4) Preparation of any epoxy resin composition Into a kneader were charged 10 parts by mass the product "SUMI-EPDXY (registered trade name)" ELM434, 70 parts by mass of that "Araldite (registered trade name)" MY0600, 20 parts by mass of that "EPICLON (registered trade name)" 830, and 15 parts by mass of that "SUMIKAEXCEL (registered trade name)" 5003P as epoxy resins. While these components were kneaded, the temperature of the system was raised to 160° C. At 160° C., the components were kneaded for 1 hour to yield a transparent viscous liquid. While the liquid was kneaded, the temperature was lowered to 80° C. Thereto were then added 40 parts by mass of 3,3'-DAS, and 74 parts by mass of one or more particle components (one or more of the thermoplastic resin particle [C] and other particle), the (blend) composition of the component(s) being shown in Table 2. These components were further kneaded. In this way, any epoxy resin composition was yielded.

(5) Production of Prepreg

A knife coater was used to apply the epoxy resin composition on each of release paper pieces. In this way, two resin films were produced. Next, the two resin films were put onto a carbon fiber "TORAYCA (registered trade name)" T800G-24K-31E manufactured by Toray Industries, Inc., in which filaments are arranged in one direction in the form of a sheet, from both surfaces of the carbon fiber. The resultant was heated and pressurized to impregnate the carbon fiber with the resin. This process was repeated to yielded one-direction prepregs in each of which the weight per unit area of the carbon fiber was 190 g/m$^2$ and the proportion by mass of the matrix resin was 35.5%. At this time, a two-stage impregnation method described below was used. The produced prepregs were each a prepreg having an outer layer in which the resin particles were highly localized.

In order to produce a resin film for any primary prepreg, the steps described in the item (4) were used to prepare an epoxy resin composition having the same composition as in the item (4) except its particle component(s), and containing no particle component. A knife coater was used to apply the epoxy resin composition onto each of release paper pieces. In this way, two resin films were produced which each had a weight per unit area of 30 g/m$^2$, which was 60% of an ordinary weight per unit area. Next, the two resin films were put onto a carbon fiber "TORAYCA (registered trade name)" T800G-24K-31E manufactured by Toray Industries, Inc., in which filaments are arranged in one direction in the form of a sheet, from both surfaces of the carbon fiber. A heat roll was used to heat and pressurize the resultant at a temperature of 100° C. under a pressure of 1 atmospheric pressure to impregnate the carbon fiber with the resin. This process was repeated to yielded primary prepregs.

Furthermore, in order to produce each resin film for two-stage impregnation, a knife coater was used to apply the epoxy resin composition prepared in the item (4) onto each of release paper pieces. In this way, resin films were produced which each had a weight per unit area of 20 g/m$^2$, which was 40% of an ordinary weight per unit area. Next, two of the resultant resin films were put onto each of the primary prepregs from both surfaces of the prepreg. A heat roll was used to heat and pressurize the resultant at a temperature of 80° C. under a pressure of 1 atmospheric pressure. This process was repeated to yield prepregs each having an outer layer in which the resin particles were highly localized. The use of this two-stage impregnation method made it possible to yield the prepregs, which each had an outer layer in which the resin particles were highly localized.

(6) The Presence Ratio of the Particles Present in a Prepreg Region Having a Depth of 20% of the Prepreg Thickness One of the one-direction prepregs produced (from any one of the epoxy resin compositions) in the item (5) was sandwiched between two polytetrafluoroethylene resin plates each having flat and smooth surfaces to be caused to adhere closely onto each other. The temperature of the resultant workpiece was gradually raised to 150° C. over 7 days to gelatinize and cure the prepreg. In this way, a plate-form resin cured product was produced. After the curing, the product was cut in a direction perpendicular to the adhering surfaces. A cross section thereof was polished, and then enlarged at 200× magnification or more through an optical microscope to be photographed so as to position the upper and lower surfaces of the prepreg inside the viewing field. At five sites of the sectional photograph along the transverse direction thereof, the interval between the polytetrafluoroethylene resin plates were measured. The average thereof (n=5) was defined as the thickness of the prepreg. Respective lines parallel to both surfaces of the prepreg were drawn, the total number of the lines was two. Each of the lines was drawn at a site of the prepreg that had, from the corresponding surface (out of the two surfaces) of the prepreg, a depth of 20% of the prepreg thickness. Next, the following were gained: the total area of the particles present between each of the surfaces of the prepreg and the line corresponding to the surface; and the total area of the particles present over the entire prepreg thickness. A calculation was then made about the presence ratio of the particles present in the region extending from each of the surfaces of the prepreg to the prepreg site having the depth of 20% of the prepreg thickness, the proportion of this thickness being 100%. The total area of the particles was obtained by gouging out portions of the particles from the sectional photograph, and then making a conversion calculation from the mass thereof.

(7) Measurement of the Intralaminar Thickness of any Fiber-Reinforced Composite Material Twenty of the one-direction prepregs produced in the item (5) were laminated onto each other to make their fiber-filament directions consistent with each other. The laminated prepregs were covered with a nylon film without generating any gap. In an autoclave, the workpiece was molded at a temperature of 180° C. under a pressure of 0.59 MPa for 2 hours while the temperature-raising rate was set to 1.5° C./minute. In this way, a laminate was produced. This was cut in a direction perpendicular to the carbon fiber filaments. A cross section thereof was polished, and then enlarged at 200× magnification or more through an optical microscope to be photographed. About a fiber-intralaminar region selected at random from the photograph, as a boundary line between the fiber-intralaminar region and the fiber layer region, a line was drawn in parallel to the carbon fiber layer to set the content by volume of the reinforcement fiber in the selected region to 50%. The boundary line was drawn so as to be averaged over a length of 100 μm. The distance therebetween was defined as the intralaminar thickness. The same operations were made at other intralaminar regions of the laminate, the total number of the operation-made regions being five. The average thereof was adopted.

In the same way as described above, a laminate was produced except that the molding conditions were changed to step-curing conditions that a temperature of 150° C. was kept for 2 hours and a temperature of 180° C. was kept for 2 hours (conditions of raising the temperature to 150° C. at a temperature-raising rate of 1.5° C./minute and keeping the temperature for 2 hours, and then raising the temperature to 180° C. at a temperature-raising rate of 1.5° C./minute and keeping the temperature for 2 hours under a pressure of 0.59 MPa). The intralaminar thickness of the laminate was measured to check effects of the change in the molding conditions.

(8) Measurement of the Area Damaged of the Fiber-Reinforced Composite Material by a Falling-Weight Impact Twenty-four of the one-direction prepregs produced in the item (5) were false-isotropically laminated onto each other to have a (+45°/0°/−45°/90°)3 s structure. The laminated prepregs were covered with a nylon film without generating any gap. In an autoclave, the workpiece was molded at a temperature of 180° C. under a pressure of 0.59 MPa for 2 hours while the temperature-raising rate was set to 1.5° C./minute. In this way, a laminate was produced. From this laminate, a test piece was cut out which had a length of 150 mm and a width of 100 mm. A falling-weight impact of 1500 in. lb./in. was applied thereto, and then an ultrasonic defectoscope was used to measure the damaged area. As described in JIS K7017 (1999), the fiber-filament direction of the one-direction fiber-reinforced composite material is determined as the axial direction of the material. When this axis direction is defined as the 0° axis, the direction perpendicular to the axial direction is defined as 90°.

In the same way as described above, a laminate was produced except that the molding conditions were changed to step-curing conditions that a temperature of 150° C. was kept for 2 hours and a temperature of 180° C. was kept for 2 hours (conditions of raising the temperature to 150° C. at a temperature-raising rate of 1.5° C./minute and keeping the temperature for 2 hours, and then raising the temperature to 180° C. at a temperature-raising rate of 1.5° C./minute and keeping the temperature for 2 hours under a pressure of 0.59 MPa). The area damaged by the falling-weight impact was measured to check effects of the change in the molding conditions.

Example 1

A kneader was used to produce an epoxy resin composition through the steps in the item (4). Through the steps in the item (5), a prepreg was yielded which had a thickness of 180 μm, and had, on each of two surfaces thereof, a particle layer in which the thermoplastic resin particles [C] were highly localized. The resultant resin composition, and the resultant prepreg was used to measure the presence ratio of the particles present in a prepreg region having a depth of 20% of the prepreg thickness in the item (6), the intralaminar thickness of the fiber-reinforced composite material in the item (7), and the damaged area of the fiber-reinforced composite material by a falling-weight impact in the item (8).

The results are shown in Table 2. Table 1 shows properties of the used thermoplastic resin particles [C].

Examples 2 to 8

Prepregs were produced in the same way as in Example 1 except that the thermoplastic resin particles [C] were changed to have a composition described in Table 2. The prepregs each had, on each of two surfaces thereof, a particle layer in which the thermoplastic resin particles [C] were highly localized. The thickness thereof was 180 μm.

The fiber-reinforced composite material obtained by molding some of the prepregs of each of Examples 1 to 8, in which the respective particles 1 to 8 satisfied both of the requirements (i) and (ii) for the component [C] were used, was sufficiently small in intralaminar thickness, so that the particle concentration in the intralaminar regions was improved. Moreover, even when the conditions were changed to those of the step-curing, an equivalent intralaminar thickness was obtained. The damaged area was restrained into a relatively small level. Even when the conditions were changed to those of the step-curing, an equivalent area was maintained.

Comparative Example 1

Prepreg was produced in the same way as in Example 1 except the use of the particles 9, which did not satisfy the requirement (i) for the component [C]. The intralaminar thickness enlarged, and the particle concentration in the intralaminar regions was low. The damaged area enlarged.

Comparative Examples 2 and 3

Prepregs were produced in the same way as in Example 1 except that the particles 10 and 11, which did not satisfy the requirement (ii) for the component [C], were used, respectively. Under the ordinary molding conditions, the intralaminar thickness was sufficiently small, and the damaged area was also restrained into small level. However, when the conditions were changed to those of the step-curing, the intralaminar thickness increased, and the damaged area also increased.

Comparative Example 4

An epoxy resin composition was produced in the same way as in Example 1 except that the particles 9, which did not satisfy the requirement (i) for the component [C], and the particles 11, which did not satisfy the requirement (ii) for the component [C], were used in amounts equal to each other. Furthermore, a prepreg was produced. When the conditions were changed to those of the step-curing, the intralaminar thickness and the damaged area fluctuated largely.

A comparison between Example 5 and Comparative Example 4 demonstrates that the object of the present invention is not attained only by mixing/blending particles made of a crystalline polymer as a raw material with particles of an non-crystalline polymer, the two particle species being each in a particulate form, but the target advantages are unprecedentedly produced by using particles which are made of a raw material that is a blend composition of a crystalline polymer and a non-crystalline polymer, and which satisfy both of the requirements (i) and (ii).

Comparative Example 5

An epoxy resin composition was produced in the same way as in Example 1 except the use of the particles 12, which did not satisfy the requirement (i) for the component [C]. Furthermore, a prepreg was produced. The intralaminar thickness enlarged, and the particle concentration in the intralaminar regions was low. The damaged area also enlarged. The glass transition temperature of the particles 12 was 49° C., and thus the composition was insufficient in heat resistance.

TABLE 1

|  |  |  | Particle 1 | Particle 2 | Particle 3 | Particle 4 | Particle 5 | Particle 6 | Particle 7 | Particle 8 | Particle 9 | Particle 10 | Particle 11 | Particle 12 |
|---|---|---|---|---|---|---|---|---|---|---|---|---|---|---|
| Composition of particles | Crystalline polymer | CX7323 | 70 | 50 | 50 | 30 | 50 |  | 15 | 5 | 100 |  |  |  |
|  |  | CX9701 |  |  |  |  |  | 50 |  |  |  |  |  |  |
|  |  | PA6 |  |  |  |  |  |  |  |  |  |  |  | 100 |
|  | Amorphous polymer | TR90 | 30 | 50 | 50 | 70 |  |  | 85 | 95 |  | 100 |  |  |
|  |  | TR55 |  |  |  |  | 50 | 50 |  |  |  |  | 100 |  |
| Properties of particles | Particle diameter | [μm] | 13 | 14 | 7 | 26 | 15 | 16 | 14 | 15 | 15 | 15 | 15 | 20 |
|  | Glass transition temperature | [° C.] | 138 | 140 | 140 | 145 | 141 | 142 | 148 | 151 | 136 | 152 | 155 | 49 |
|  | (a) 180° C. G' | [MPa] | 35 | 34 | 34 | 1.4 | 35 | 33 | 1.4 | 1.5 | 78 | 1.5 | 2.8 | 142 |
|  | (b) 160° C. G' | [MPa] | 72 | 69 | 69 | 3 | 72 | 69 | 3.0 | 2.9 | 130 | 2.9 | 16 | 182 |
|  | (c) 200° C. G' | [MPa] | 21 | 15 | 15 | 0.7 | 17 | 14 | 0.7 | 0.6 | 38 | 0.4 | 2.3 | 73 |
|  | (b)/(c) |  | 3.4 | 4.6 | 4.6 | 4.2 | 4.2 | 4.9 | 4.5 | 5.0 | 3.4 | 7.3 | 6.8 | 2.5 |

TABLE 2

|  |  |  | Example 1 | Example 2 | Example 3 | Example 4 | Example 5 | Example 6 | Example 7 | Example 8 |
|---|---|---|---|---|---|---|---|---|---|---|
| Particle [C] |  | Particle 1 | 100 |  |  |  |  |  |  |  |
|  |  | Particle 2 |  | 100 |  |  |  |  |  |  |
|  |  | Particle 3 |  |  | 100 |  |  |  |  |  |
|  |  | Particle 4 |  |  |  | 100 |  |  |  |  |
|  |  | Particle 5 |  |  |  |  | 100 |  |  |  |
|  |  | Particle 6 |  |  |  |  |  | 100 |  |  |
|  |  | Particle 7 |  |  |  |  |  |  | 100 |  |
|  |  | Particle 8 |  |  |  |  |  |  |  | 100 |
| Another particle |  | Particle 9 |  |  |  |  |  |  |  |  |
|  |  | Particle 10 |  |  |  |  |  |  |  |  |
|  |  | Particle 11 |  |  |  |  |  |  |  |  |
|  |  | Particle 12 |  |  |  |  |  |  |  |  |
| Presence ratio of the particles in surface area (%) |  |  | 97 | 96 | 94 | 98 | 96 | 97 | 97 | 97 |
| Properties of fiber-reinforced composite material | Intralaminar thickness [μm] | Ordinary molding condition | 28 | 27 | 25 | 30 | 25 | 26 | 25 | 24 |
|  |  | Step-curing | 29 | 28 | 27 | 31 | 27 | 27 | 26 | 27 |
|  | Damaged area [mm²] | Ordinary molding condition | 480 | 460 | 460 | 470 | 450 | 450 | 450 | 450 |
|  |  | Step-curing | 490 | 480 | 490 | 480 | 460 | 470 | 460 | 490 |

|  |  |  | Comparative Example 1 | Comparative Example 2 | Comparative Example 3 | Comparative Example 4 | Comparative Example 5 |
|---|---|---|---|---|---|---|---|
| Particle [C] |  | Particle 1 |  |  |  |  |  |
|  |  | Particle 2 |  |  |  |  |  |
|  |  | Particle 3 |  |  |  |  |  |
|  |  | Particle 4 |  |  |  |  |  |
|  |  | Particle 5 |  |  |  |  |  |
|  |  | Particle 6 |  |  |  |  |  |
|  |  | Particle 7 |  |  |  |  |  |
|  |  | Particle 8 |  |  |  |  |  |
| Another particle |  | Particle 9 | 100 |  |  | 50 |  |
|  |  | Particle 10 |  | 100 |  |  |  |
|  |  | Particle 11 |  |  | 100 | 50 |  |
|  |  | Particle 12 |  |  |  |  | 100 |
| Presence ratio of the particles in surface area (%) |  |  | 98 | 97 | 96 | 96 | 95 |
| Properties of fiber-reinforced | Intralaminar thickness [μm] | Ordinary molding condition | 37 | 24 | 25 | 31 | 40 |

TABLE 2-continued

| | | | | | | | |
|---|---|---|---|---|---|---|---|
| composite material | Damaged area [mm²] | Step-curing | 38 | 29 | 30 | 36 | 42 |
| | | Ordinary molding condition | 680 | 460 | 470 | 490 | 580 |
| | | Step-curing | 690 | 560 | 550 | 550 | 600 |

INDUSTRIAL APPLICABILITY

The present invention makes it possible to yield a fiber-reinforced composite material exhibiting stable and excellent interlaminar fracture toughness and impact resistance under wide molding conditions. The composite material is usable particularly suitable for large-sized structural materials. The composite material is usable suitably for, for example, main wings, tail units, floor beams and other airplane primary structural members for airplane and cosmic articles; a flap, an aileron, a cowl, a fairing, an interior member, and other secondary structural members therefor; a rocket motor case, and an artificial satellite; and others. The composite material is also usable suitably for general industrial articles, for example, structural members for mobile bodies such as automobiles, ships, railroad vehicles, drive shafts, flat springs, water mill blades, various turbines, pressure containers, flywheels, rollers for papermaking, roof members, cables, reinforcement bars, repairing and reinforcing materials, and other civil engineering and architectural articles. Furthermore, the composite material is usable suitably for sporting articles, such as golf shafts, fishing rods, rackets for tennis, badminton, squash and others, sticks for field hockey, and ski poles.

The invention claimed is:

1. A prepreg, comprising at least the following materials [A] to [C], wherein 90% or more of the material [C] is present inside a region of the prepreg that extends from any surface of the prepreg to a prepreg site having, from the surface, a depth of 20% of the thickness of the prepreg:
   a reinforcement fiber [A],
   a thermosetting resin [B], and
   thermoplastic resin particles [C] which are insoluble in the thermosetting resin [B], which comprise at least one polyamide polymer having crystallinity and at least one non-crystalline polyamide polymer wherein the ratio by mass of the crystalline polymer to the non-crystalline polymer ranges from 7/3 to 1/19, and which satisfy the following (i) and (ii):
   (i) the storage elastic modulus G' of the material constituting the particles is more than 1 MPa, and 70 MPa or less at 180° C., and
   (ii) the ratio of the storage elastic modulus G' of the material constituting the particles at 160° C. to the storage elastic modulus G' of the material at 200° C. ranges from 1 to 5.

2. The prepreg according to claim 1, wherein the thermoplastic resin particles [C] have a glass transition temperature of 80 to 180° C.

3. A fiber-reinforced composite material, which is formed by curing the prepreg according to claim 2.

4. The prepreg according to claim 1, wherein the thermoplastic resin particles [C] have a sphericity of 90 to 100.

5. A fiber-reinforced composite material, which is formed by curing the prepreg according to claim 4.

6. The prepreg according to claim 1, wherein the thermosetting resin [B] is an epoxy resin.

7. A fiber-reinforced composite material, which is formed by curing the prepreg according to claim 6.

8. The prepreg according to claim 1, wherein the reinforcement fiber [A] is carbon fiber.

9. A fiber-reinforced composite material, which is formed by curing the prepreg according to claim 8.

10. A fiber-reinforced composite material, which is formed by curing the prepreg according to claim 1.

* * * * *